US007710110B2

(12) United States Patent
Patil et al.

(10) Patent No.: US 7,710,110 B2
(45) Date of Patent: May 4, 2010

(54) ROTARY SENSOR WITH ROTARY SENSING ELEMENT AND ROTATABLE HOLLOW MAGNET

(75) Inventors: Swapnil Patil, Thane (IN); Nurul I. Hasan, Bodinayakanur (IN); Suresh Krishna, Thuraiyur (IN); Azhagar Raj M, Vilathikulam (IN); Vivek Salunke, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 283 days.

(21) Appl. No.: 11/825,722

(22) Filed: Jul. 7, 2007

(65) Prior Publication Data

US 2009/0009159 A1 Jan. 8, 2009

(51) Int. Cl.
*G01B 7/30* (2006.01)
(52) U.S. Cl. ............................ 324/207.25; 324/207.2; 324/174
(58) Field of Classification Search ................ None
See application file for complete search history.

(56) References Cited

U.S. PATENT DOCUMENTS

| 3,942,045 | A | * | 3/1976 | Palazzetti | 310/155 |
|---|---|---|---|---|---|
| 5,093,617 | A | | 3/1992 | Murata | 324/235 |
| 5,144,234 | A | | 9/1992 | Murata | 324/235 |
| 5,196,794 | A | | 3/1993 | Murata | 324/251 |
| 5,239,263 | A | * | 8/1993 | Iwata et al. | 324/207.25 |
| 5,321,355 | A | * | 6/1994 | Luetzow | 324/207.2 |
| 5,781,005 | A | * | 7/1998 | Vig et al. | 324/207.2 |
| 6,288,533 | B1 | * | 9/2001 | Haeberli et al. | 324/207.2 |
| 6,707,293 | B2 | | 3/2004 | Wan | 324/207.25 |
| 7,019,517 | B2 | | 3/2006 | Hagan | 324/207.25 |
| 7,208,940 | B2 | | 4/2007 | Withanawasam et al. | 324/207.25 |
| 7,221,153 | B2 | * | 5/2007 | Matsumoto et al. | 324/207.25 |
| 2004/0130314 | A1 | * | 7/2004 | Bossoli et al. | 324/174 |
| 2007/0075705 | A1 | * | 4/2007 | Kurumado | 324/207.25 |

OTHER PUBLICATIONS

*A CMOS Rotary Encoder System Based on Magnetic Pattern Analysis with a Resolution of 10b per Rotation*; S. Kawahito, T. Takahashi, Y. Nagano, K. Nakano; 2005 International Solid-State Circuits Conference, Feb. 2005.
*Contactless Angle Measurement Using Four Hall Devices on Single Chip*; M. Metz, A. Haberli, M. Schneider, R. Steiner, C. Maier, H. Baltes; 1997 International Conference on Solid-State Sensors and Actuators, Jun. 1997.
Contactless 360 degrees absolute angular CMOS Microsystem based on vertical Hall Sensors; M. Demierre, E. Schurig, C. Schott, P.A. Besse, R.S. Popovic; Sensors and Actuators, vol. A116 No. 1, Oct. 4, 2004, pp. 39-44 (Abstract).

(Continued)

*Primary Examiner*—Jay M Patidar (57) ABSTRACT

A robust solution for eccentricity issues in 360 degree rotary sensor application utilizing a hollow cylindrical magnet. A hollow cylindrical magnet design can be implemented to drive a parallel field magnetic sensor based on Hall/AMR technologies. Eccentricity variations of +/−0.46 mm on X and Y axes can be reduced by at least 20%, in turn improving the repeatability, linearity error and a correlation error associated with the sensor. For tilts of +/−3 degrees, the error can be reduced to at least 50% compared to a solid magnet, thereby increasing the repeatability and accuracy of the rotary sensor. The disclosed design improves linearity, is robust in vibration and improves reliability in lifecycle as the sensor configuration is less affected by wear and tear due to mechanical vibrations.

19 Claims, 6 Drawing Sheets

OTHER PUBLICATIONS

Contactless Angle Measurement Using Four Hall Devices on a Single Chip; M. Metz, A. Haberli, M. Schneider, R. Steiner, C. Maier, H. Baltes; International Conference on Solid-State Sensors and Actuators; Part No. vol. 1, 1997, pp. 385-388 (Abstract).

Magnetic Sensors for Automotive Applications; CPO Treutler; Sensors and Actuators A: Physical; Jun. 5, 2001, vol. A91, No. 1-2, (Abstract).

New Fullly Integrated 3-D Silicon Hall Sensor for Precise Angular-Position Measurements; F. Burger, P. Besse, R.S. Popovic; Sensors and Actuators A: Physical; vol. A67, No. 1-3, May 15, 1998, pp. 72-76 (Abstract).

Sine-cosine Rotation Sensor for 360 Degree Angle Measurement; J.A. Wereb, Sensors, vol. 12, No. 11, 1995, pp. 40-41 (Abstract).

* cited by examiner

ROTARY SENSOR WITH ROTARY SENSING ELEMENT AND ROTATABLE HOLLOW MAGNET

TECHNICAL FIELD

Embodiments are generally related to sensor systems and methods. Embodiments are also related to rotary position sensors. Embodiments are additionally related to rotary sensor applications that utilize hollow cylindrical magnets.

BACKGROUND OF THE INVENTION

Rotary position sensors include potentiometers, resolvers, encoders and a variety of magnetic and capacitive technologies. Each device possesses characteristic advantages and disadvantages that make some devices more suitable for particular applications than others. A Non-contact Rotary Position Sensor, for example, converts rotary motion into an electrical signal to assist in providing the control data necessary for major chassis systems and other automotive and non-automotive applications.

The linear output voltage from a Non-contact Rotary Position Sensor's is directly proportional to the sensor's angle of rotation. Non-contact performance can be made possible by a variety of technologies that include the latest linear programmable, fully-integrated Hall Effect and Anisotropic magneto resistive (AMR) technologies.

The Hall Effect is based on an operating distance range, repeatability, various ranges from which to select, and a minimum target distance. The operating distance range is the absolute maximum range over which the device can provide sensible readings. Devices with various selectable ranges allow the device to be field-adjustable. Depending on the technology utilized, proximity sensors require a minimum target size.

Adding an integrated magnetic concentrator to a Hall Effect sensor enables high-accuracy 360° rotary position sensing. One example of a prior art 360° rotary sensor is disclosed in U.S. Pat. No. 6,707,293, entitled "360-Degree Rotary Position Sensor Having a Magnetoresistive Sensor an a Hall sensor," which issued to Wan et al on Mar. 16, 2004 and is assigned to Honeywell International Inc. U.S. Pat. No. 6,707,293 is incorporated herein by reference. The Hall technology, based on integrated magnetic concentrators (IMCs), enables the development of small, cost-effective, high-accuracy noncontact rotary position sensors intended to solve long-standing challenges in 360° position sensing.

As automotive systems continue to develop in their complexity and performance, the increased need for rotary sensor products in the automotive market demands an improved robust design. Eccentricity or dislocation of the magnet position may occur due to harsh operating conditions such as, for example, wear and tear in the lifecycle, which is most common in automotive applications.

One prior art sensing technique involves the use of a diametrically magnetized solid magnet that drives a parallel field magnetic sensor based on Hall or AMR technology. Such a technique and/or apparatus contain several limiting constraints. Based on the stimulation results, for eccentricities of +/−0.46 mm on X and Y axes, which is common in automotive applications, the Bx and By output varies by 1.96% & 0.68% respectively. Due to this issue, achieving the same repeatability every time when the sensor is tested is questionable.

Because of the increase in error, the correlation error in dual o/p sensor may be increased. Based on the stimulation results, a tilt of the magnet for +/−3 degrees on the X axis can cause the Bx and By parameters to vary by 4.89% & 4.7% respectively. A tilt of 3 degrees can be due to the clearance between the rotating parts. The clearance can be provided to enable free rotation of the parts.

Due to an increase in the B field components error, the linearity and correlation errors, in the case of dual o/p sensors, can increase. Polarity identification during the assembly of the sensor calls for a tedious process that increases product costs. The centrality between the magnet and the sensor IC must be maintained in an ideal location, which is critical to effective sensor operations. A mechanical support can be, for example, actually provided by a bonding at the bottom or a potting located at the top side of the magnet. There is no pole to hold the magnet inside the rotor slot.

Based on the foregoing, it is believed that a need exists for a robust design to overcome the problems of eccentricity or dislocation of the magnet position with respect to the desired position with sensing element. It is believed that the system and method disclosed herein provides a solution to these problems by offering a configuration in which a hollow cylindrical magnet design can be implemented to drive the parallel field magnetic sensor with a unique configuration based on Hall/AMR technologies.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensor system and method.

It is another aspect of the present invention to provide for an improved rotary position sensing system and method.

It is a further aspect of the present invention to provide for a solution for eccentricity issues in 360 degree rotary sensor applications.

The aforementioned aspects and other objectives and advantages can now be achieved as described herein. An improved rotary sensor apparatus and method thereof are disclosed, which includes a hollow cylindrical magnet design implemented to drive a parallel field magnetic sensor based on Hall/AMR principals. The variation in the X and Y axes can be reduced by, for example, 20% compared with the use of a solid magnet. The configuration and methodology described herein can improve repeatability, while reducing linearity and correlation errors associated the rotary sensor. For tilts of +/−3 degrees, for example, the error can be reduced to 50% compared to the use of a solid magnet. The use of the hollow cylindrical magnet described herein represents a major advantage and increase in repeatability and accuracy. The polarity of rotary sensor can be identified by locating a chamber on the magnet ID at the "north pole" of the cylindrical magnet. The centrality between the cylindrical magnet and the chip is less critical. A pole in the rotor, however, can provide a good support for fixing the magnet within the rotor, over which the magnet can be either heat stacked or bonded.

The disclosed concept can be utilized for implementing a rotary position sensor with less error after lifecycle while improving the yield during production. A platform electronics and magnet combination can be configured for serving user requirements (range of measurement and other specifications) quickly. The novelty of the design includes improved linearity and robustness in vibration, and part-to-part variations during manufacturing of the rotary sensor, thereby increasing yield in production and improved reliability in lifecycle as design is less affected by wear and tear due to mechanical vibrations.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
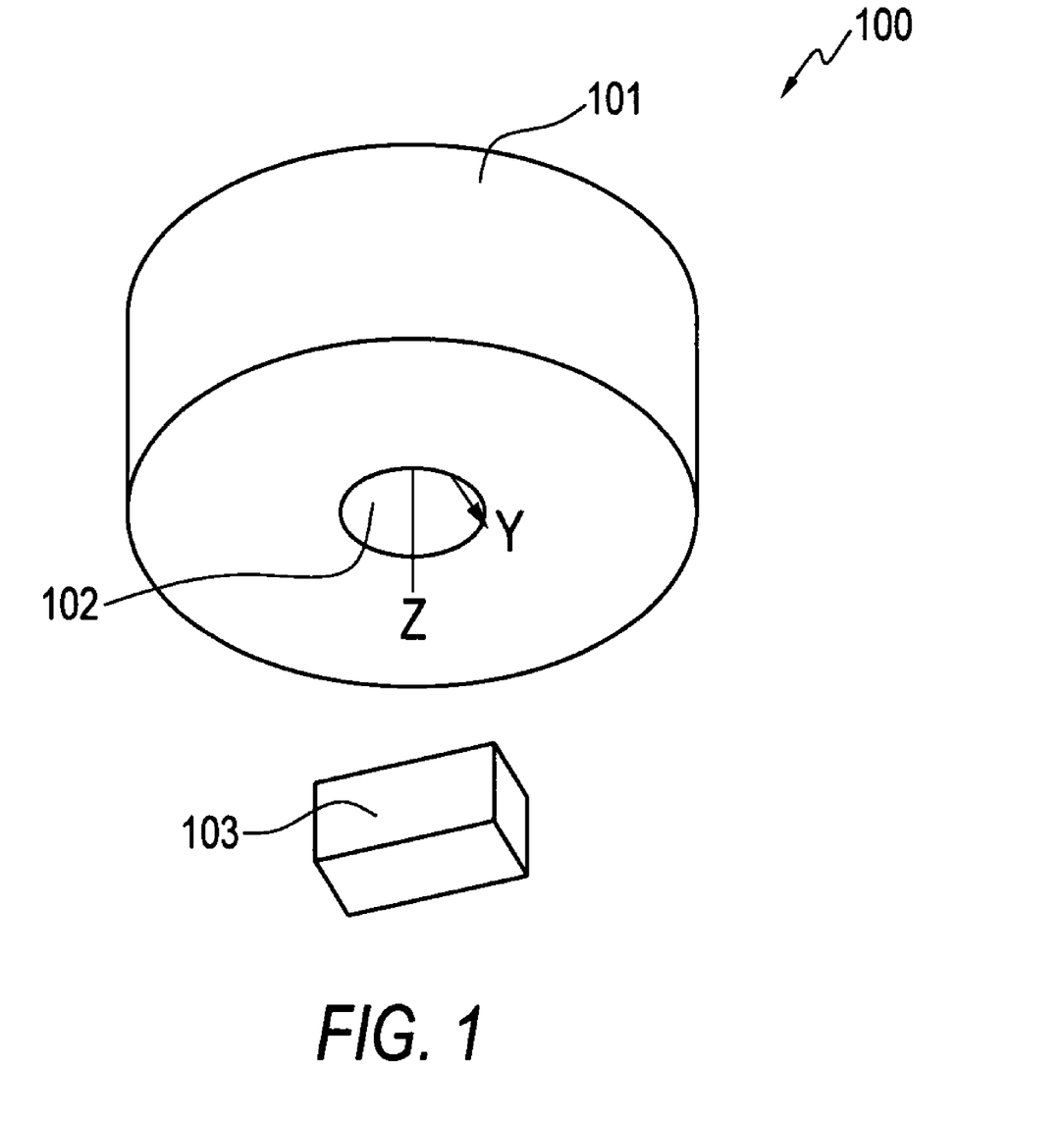
FIG. 1 illustrates a perspective view of a hollow cylindrical magnet as a robust solution for eccentricity issues in rotary sensor application, which can be implemented in accordance with a preferred embodiment.

Referring to FIG. 1, a perspective view of a hollow cylindrical magnet 100 is illustrated, as a robust solution for eccentricity issues in rotary sensor applications, in accordance with a preferred embodiment. The hollow cylindrical magnet 100 includes a magnetic cylindrical surface (shell) 101 with a hollow cavity 102. A rotary sensing element such as, for example, a AMR/Hall chip 103 can be arranged in a position below the cylindrical magnet 101. The rotary sensing element or Hall/AMR chip 103 comprises a sensing element (not shown in figure) fitted in a hybrid integrated circuit.

Figure 2:
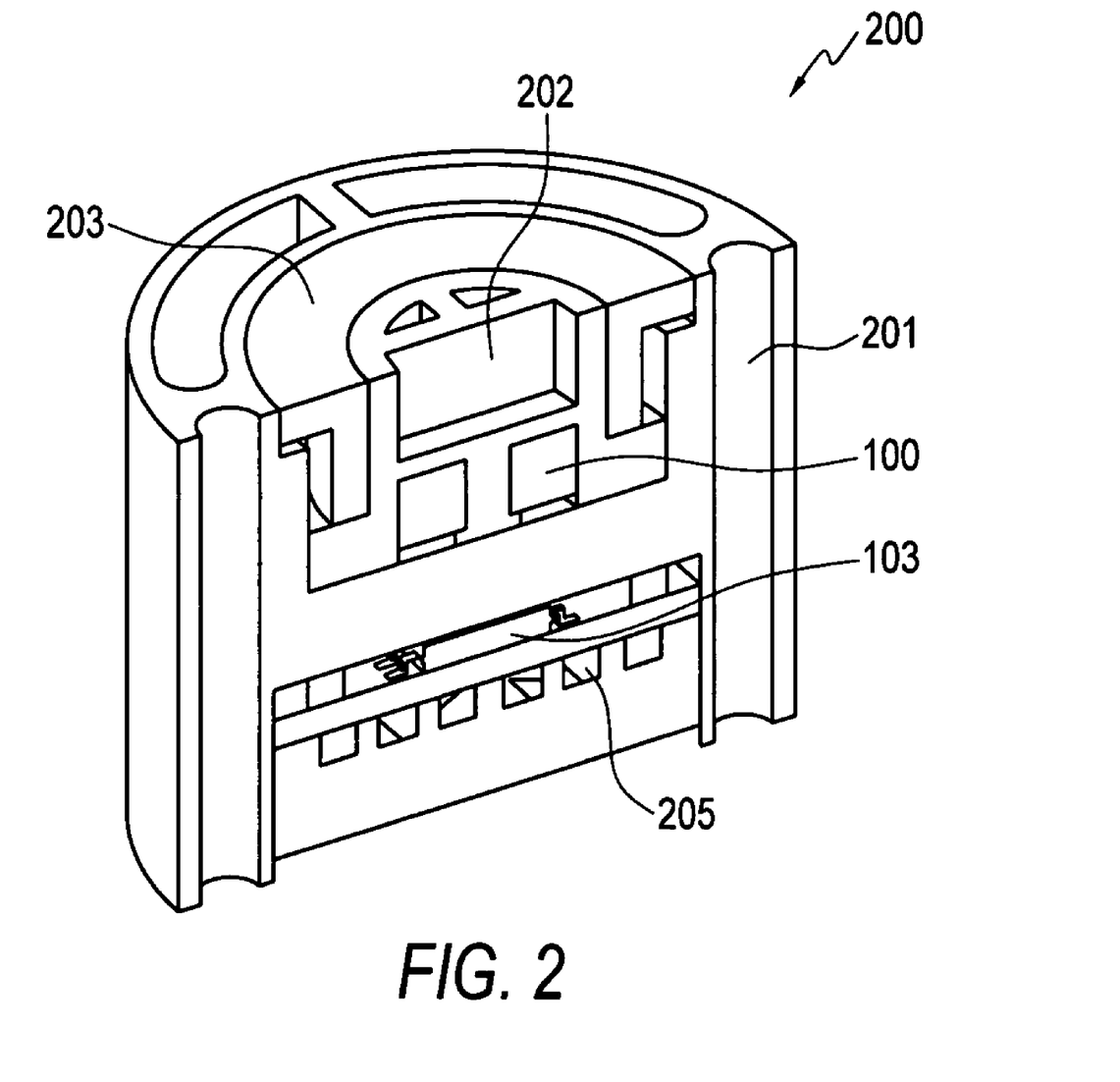
FIG. 2 illustrates a cross-sectional view of a rotary position sensor with hollow cylindrical magnet, which can be implemented in accordance with a preferred embodiment.

FIG. 2 illustrates a cross-sectional view of a rotary position sensor apparatus 200 apparatus equipped with the hollow cylindrical magnet 100 depicted in FIG. 1, in accordance with a preferred embodiment. The cylindrical magnet 100 can be held and/or maintained by a rotor 202 (which can also be referred as "magnet holder"). The rotary sensor apparatus 100 further includes the Hall/AMR chip 103 in association with a PCB and other electronic circuitry 204. The cylindrical magnet 100 and the rotor 202 can be enclosed by a cover 203. A sensor housing 201 can be further provided in association with the rotary sensor apparatus 200, such that the sensor housing 201 incorporates all sensor components.

Figure 3:
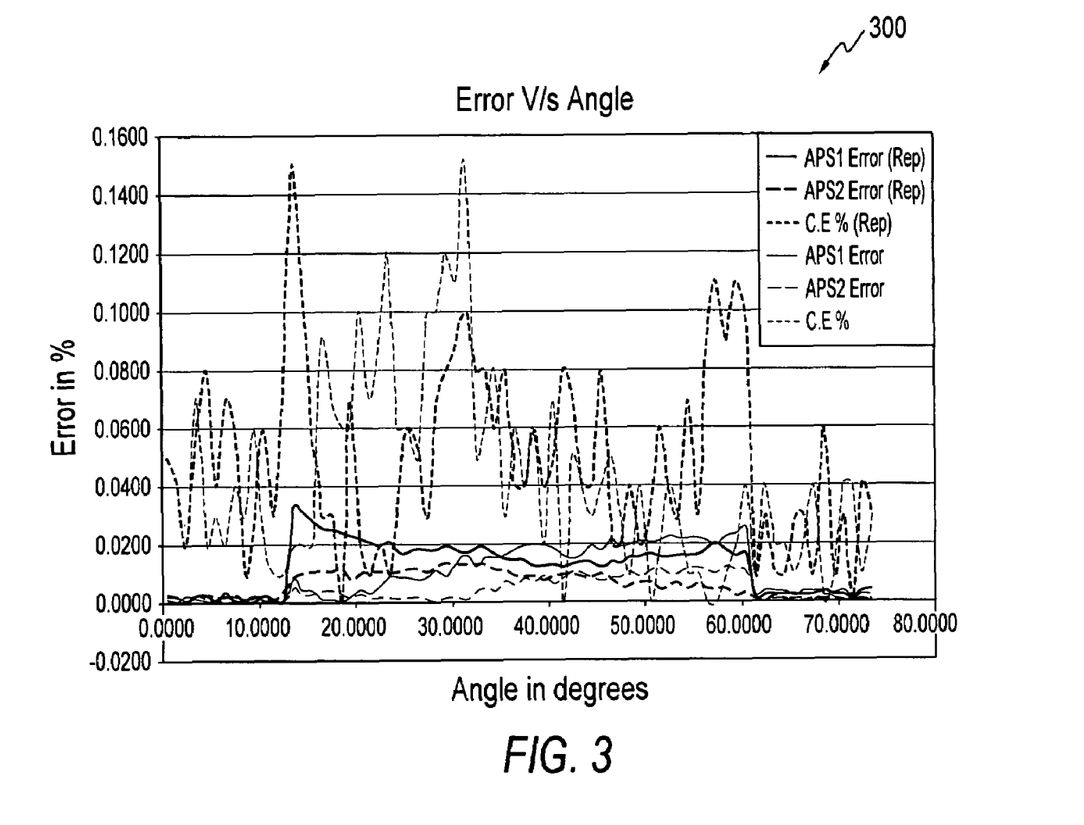
FIG. 3 illustrates a graph 300 of data generated by the hollow cylindrical magnet design depicted in FIGS. 1-2, which can be implemented in accordance with preferred or alternate embodiments.

FIG. 3 illustrates a graph 300 of data generated by the hollow cylindrical magnet design depicted in FIGS. 1-2, which can be implemented in accordance with preferred or alternate embodiments. Graph 300 depicts an example of a correlation error in percentage versus angle in degrees. The particular errors and angles depicted in graph 300 are presented for illustrative purposes only and are not considered a limiting feature of the disclosed embodiments. The graph 300 includes example lab results with a PCB and the hollow cylindrical magnet 100 (i.e., without a shift in a center position).

Figure 4:
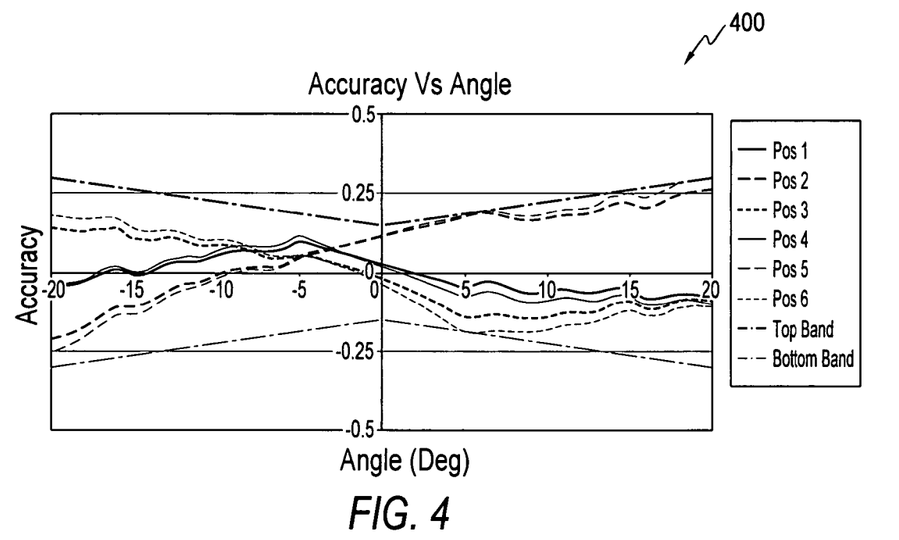
FIG. 4 illustrates a graph 400 of data generated by a solid magnet design that can be compared with the data generated by the hollow cylindrical magnet design depicted in FIGS. 1-2.

FIG. 4 illustrates a graph 400 of data generated by a solid magnet to compare with the data generated by the hollow cylindrical magnet design depicted in FIGS. 1-2. Graph 400 depicts an example of an error plot where accuracy, predicted for all the offset positions in the X and Y axes, versus angle in degrees. Here simulation was carried out with a solid magnet (not shown in figure) and Hall/AMR chip 103 for different offset positions.

Figure 5:
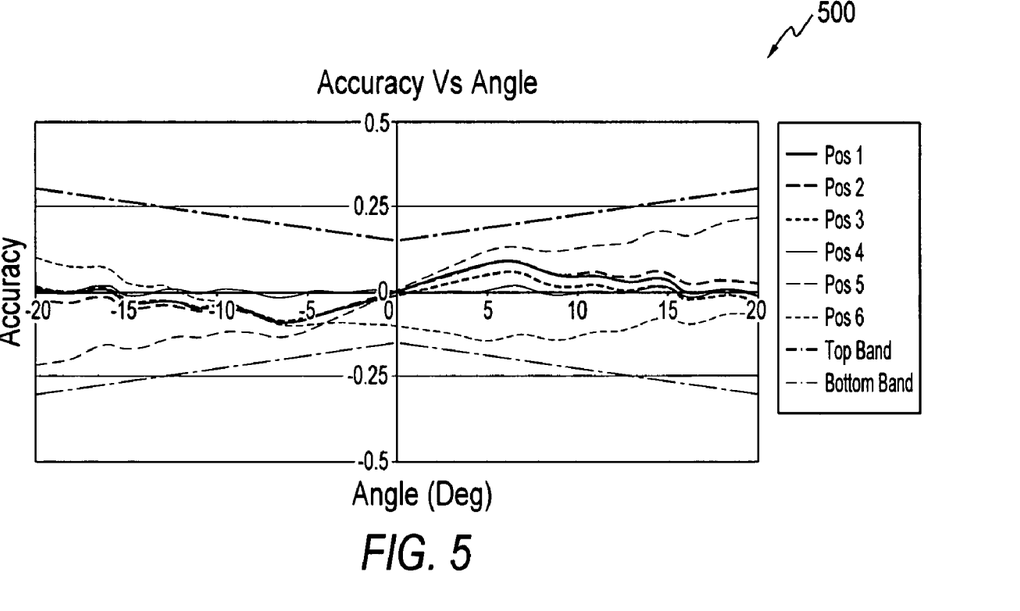
FIG. 5 illustrates a graph 500 of data generated by the hollow cylindrical magnet design depicted in FIGS. 1-2, which can be implemented in accordance with preferred or alternate embodiments.

FIG. 5 illustrates a graph 500 of data generated by the hollow cylindrical magnet design depicted in FIGS. 1-2, which can be implemented in accordance with preferred or alternate embodiments. Graph 500 depicts an example of an error plot where accuracy, predicted for the same offset positions considered for solid magnet (Graph 400), versus angle in degrees. Here simulation was carried out with a hollow cylindrical magnet design depicted in FIGS. 1-2 and Hall/AMR chip 103 for different offset positions. Graph 500 illustrates that the accuracy of all the positions are within the allowable band with good margin. Compared to solid magnet simulation, the hollow cylindrical magnet simulation results show a significant improvement in accuracy. The particular values of accuracy and angles depicted in graph 400 and 500 are presented for illustrative purposes only and are not considered a limiting feature of the disclosed embodiments.

Figure 6:
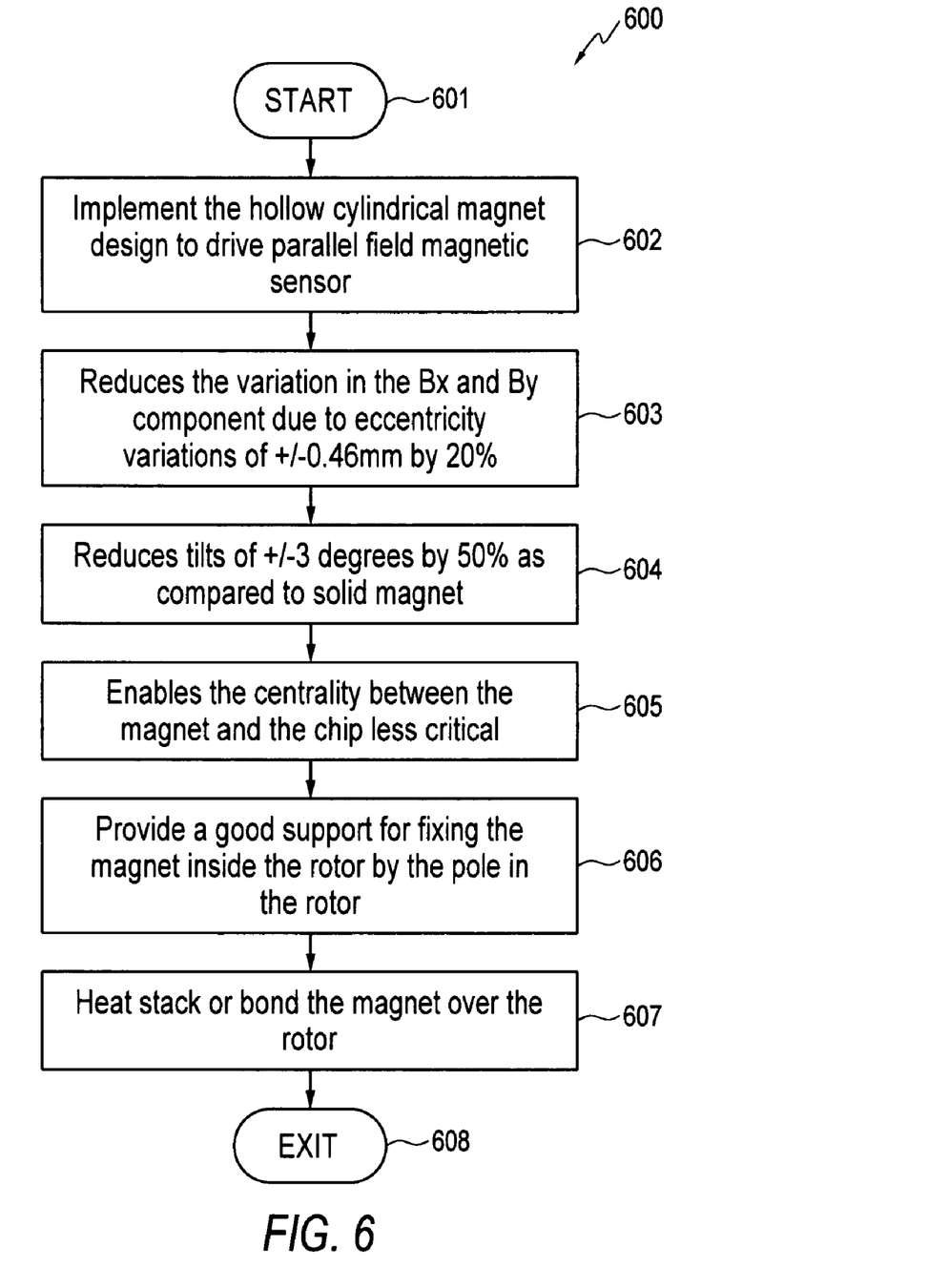
FIG. 6 illustrates a high-level flow chart of operations depicting logical operational steps of a method for solving eccentricity issues in a rotary sensor, in accordance with an alternative embodiment.

FIG. 6 illustrates a high-level flow chart of operations depicting logical operational steps of a method 600 for solving eccentricity issues associated with a rotary sensor, in accordance with an alternative embodiment. The process begins as depicted at block 601. Next as described at block 602, the hollow cylindrical magnet 100 can be implemented to drive a parallel field magnetic sensor based on Hall/AMR principals and configurations. Thereafter, as indicated at block 603, the variation in the Bx and By components due to eccentricity variations of +/−0.46 mm can be reduced by 20%. Next, as depicted at block 604, tilts of +/−3 degrees can be reduced to 50% compared to solid magnet. Thereafter, as depicted at block 605, the design of the rotary sensor 200 enables the centrality between the magnet 101 and the sensing element or chip 103 less critical. The pole in the rotor provides a good support for fixing the magnet 101 inside the rotor as indicated at block 606. Next, as depicted at block 607, the magnet 101 can be heat stacked or bonded over the rotor. The process can then terminate as depicted at block 608.

The constraints in solid magnet design include larger gauss error due to eccentricity variations and magnet tilts and fixing the magnet in the rotor. The hollow cylindrical magnet design possesses less Gauss error in eccentricity variations and magnet tilts and fixing the magnet in rotor is robust with a pole design. Stimulation results show that cylindrical magnet is less prone to errors as compared to solid magnet due to shift and tilt in position.

The salient features of the design includes a miniature size, which increases the magnet robustness, lessening the correlation error in a dual O/P sensor, and also causing a simple fitting arrangement of the magnet in a plastic part while identification.

The hollow cylindrical magnetic design described herein can find extensive applications in automotive markets, such as, for example, in throttle position sensors pedal position sensors, EGR valve position sensors, steering position sensors and the like. The design can also be employed in magnetic encoder applications in commercial market.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A rotary sensor apparatus, comprising:
   a rotary sensing element;
   a magnet having a hollow cavity extending through the magnet from a first side of the magnet to a second side, the magnet is rotatably mounted relative to the rotary sensing element so that the magnet is rotatable with the first side of the magnet remaining adjacent to the rotary sensing element, the rotary sensing element is arranged in a position spaced from said magnet with said hollow cavity extending along an axis that intersects at least part of the rotary sensing element, the rotary sensing element configured to detect rotational displacement of said magnet relative to the rotary sensing element; and
   wherein said magnet is associated with said rotary sensing element such that a presence of said hollow cavity within said magnet functions to mitigate an effect of eccentricity and/or tilt of said magnet relative to said rotary sensing element on the detected rotational displacement.

2. The rotary sensor apparatus of claim 1 wherein said rotary sensing element comprises an AMR sensor.

3. The rotary sensor apparatus of claim 1 wherein said rotary sensing element comprises a Hall sensor.

4. The rotary sensor apparatus of claim 1 wherein said rotary sensing element includes an AMR sensor and a Hall sensor.

5. The rotary sensor apparatus of claim 1 wherein said magnet is a cylindrical magnet having a cylindrical outer surface and two end surfaces, with said hollow cavity extending between said two end surfaces.

6. The rotary sensor apparatus of claim 5 wherein each of said two end surfaces is circular or elliptical in shape.

7. The rotary sensor apparatus of claim 1 wherein said rotary sensing element further comprises a sensing element fitted in a hybrid integrated circuit.

8. The rotary sensor apparatus of claim 1 further comprising a rotor to which said magnet is connected, said rotor is rotatably mounted relative to the rotary sensing element.

9. The rotary sensing apparatus of claim 1, wherein the magnet rotates about the axis that the hollow cavity extends along.

10. A rotary sensor apparatus, comprising:
    a rotary sensing element;
    a magnet having a hollow cavity extending through the magnet from a first side of the magnet to a second side, the magnet is rotatably mounted relative to the rotary sensing element so that the magnet is rotatable with the first side of the magnet remaining adjacent to the rotary sensing element, the rotary sensing element configured to detect rotational displacement of said magnet relative to the rotary sensing element;
    wherein said magnet is associated with said rotary sensing element such that a presence of said hollow cavity within said magnet functions to mitigate an eccentricity associated with detecting said rotational displacement; and
    wherein said magnet is configured for use in reducing the eccentricity variations of said eccentricity with a range of +/−0.46 mm on an X-axis and a Y-axis by at least 20%.

11. A rotary sensor apparatus, comprising:
    a rotary sensing element;
    a magnet having a hollow cavity extending through the magnet from a first side of the magnet to a second side, the magnet is rotatably mounted relative to the rotary sensing element so that the magnet is rotatable with the first side of the magnet remaining adjacent to the rotary sensing element, the rotary sensing element configured to detect rotational displacement of said magnet relative to the rotary sensing element;
    wherein said magnet is associated with said rotary sensing element such that a presence of said hollow cavity within said magnet functions to mitigate an eccentricity associated with detecting said rotational displacement; and
    wherein said magnet is adapted for use in reducing an error by at least 50% for a tilt of +/−3 degrees relative to a solid magnet without the hollow cavity.

12. A rotary sensor apparatus, comprising:
    a rotary sensing element; and
    a cylindrical magnet having a cylindrical outer surface and two end surfaces, with a hollow cavity extending through said cylindrical magnet between the two end surfaces, the cylindrical magnet is rotatably mounted relative to the rotary sensing element so that the cylindrical magnet is rotatable with one of the two end surfaces of the cylindrical magnet remaining adjacent to the rotary sensing element, the rotary sensing element is arranged in a position adjacent said magnet with said hollow cavity extending along an axis that intersects at least part of the rotary sensing element, the rotary sensing element configured to detect rotational displacement of said cylindrical magnet relative to the rotary sensing element; and
    wherein said cylindrical magnet is associated with said rotary sensing element such that a presence of said hollow cavity within said cylindrical magnet functions to mitigate an effect of eccentricity and/or tilt of said cylindrical magnet relative to the rotary sensing element on the detected rotational displacement of said cylindrical magnet.

13. The rotary sensor apparatus of claim 12 wherein said rotary sensing element comprises an AMR sensor.

14. The rotary sensor apparatus of claim 12 wherein said rotary sensing element comprises a Hall sensor.

15. The rotary sensor apparatus of claim 12 wherein said rotary sensing element includes an AMR sensor and a Hall sensor.

16. A method of sensing rotational displacement of a magnet relative to a rotary sensing element, comprising:
    providing a magnet and a rotary sensing element, wherein the magnet has a hollow cavity extending through the magnet from a first side of the magnet to a second side;
    rotating the magnet while the first side of the magnet remains adjacent to the rotary sensing element, with the rotary sensing element arranged in a position spaced from the magnet with said hollow cavity extending along an axis that intersects at least part of the rotary sensing element;
    wherein said magnet is associated with said rotary sensing element such that a presence of said hollow cavity within said magnet functions to mitigate an effect of eccentricity and/or tilt of said magnet relative to the rotary sensing element on the detected rotational displacement of said magnet; and using the rotary sensing element to detect rotational displacement of said magnet relative to the rotary sensing element.

17. The method of claim 16 wherein said magnet is a cylindrical magnet having a cylindrical outer surface and two end surfaces, wherein one of the end surfaces remains adjacent to the rotating sensing element while the cylindrical magnet is rotated relative to the rotating sensing element.

18. The method of claim 16 wherein said rotary sensing element includes a sensing element fitted in a hybrid integrated circuit.

19. The method of claim 16 further comprising:
providing a rotor to which said magnet is connected.

* * * * *